United States Patent
Yamashita et al.

(10) Patent No.: US 11,081,941 B2
(45) Date of Patent: Aug. 3, 2021

(54) MOTOR AND ELECTRIC POWER STEERING DEVICE

(71) Applicant: Nidec Corporation, Kyoto (JP)

(72) Inventors: Yoshiaki Yamashita, Kyoto (JP); Hiromitsu Ohashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 142 days.

(21) Appl. No.: 16/496,553

(22) PCT Filed: Mar. 9, 2018

(86) PCT No.: PCT/JP2018/009175
§ 371 (c)(1),
(2) Date: Sep. 23, 2019

(87) PCT Pub. No.: WO2018/180360
PCT Pub. Date: Oct. 4, 2018

(65) Prior Publication Data
US 2020/0295631 A1    Sep. 17, 2020

(30) Foreign Application Priority Data
Mar. 31, 2017   (JP) .............................. JP2017-070710

(51) Int. Cl.
*H02K 11/33*    (2016.01)
*H02K 11/215*    (2016.01)
(Continued)

(52) U.S. Cl.
CPC ............ *H02K 11/33* (2016.01); *H02K 11/215* (2016.01); *H02P 27/08* (2013.01); *B62D 5/0421* (2013.01); *B62D 5/0454* (2013.01); *B62D 5/0463* (2013.01)

(58) Field of Classification Search
CPC ........ H02K 11/33; H02K 11/215; H02P 27/08; H02P 25/16; B62D 5/0421; B62D 5/0454; B62D 5/0463; B62D 5/0484; H02M 7/48
(Continued)

(56) References Cited

U.S. PATENT DOCUMENTS 7,439,697 B2 * 10/2008 Miyazaki .......... H02M 7/53875
318/400.41
9,018,809 B2    4/2015 Rippel et al.
(Continued)

FOREIGN PATENT DOCUMENTS

| CN | 102844961 A | 12/2012 |
|---|---|---|
| CN | 104854469 A | 8/2015 |
| JP | 2014-192950 A | 10/2014 |

OTHER PUBLICATIONS

Official Communication issued in corresponding Chinese Patent Application No. 201880022924.8, dated Nov. 2, 2020.

*Primary Examiner* — John K Kim
(74) *Attorney, Agent, or Firm* — Keating & Bennett

(57) ABSTRACT

A motor includes a first inverter connected to one end of a winding of each phase and a second inverter connected to another end of the winding of each phase. The first inverter includes a terminal electrically connected to one end of a U-phase winding. The second inverter includes a terminal electrically connected to another end of the U-phase winding. Current output from the terminal of the first inverter and passing through the U-phase winding flows to the terminal of the second inverter. Current output from the terminal of the second inverter and passing through the U-phase winding flows to the terminal of the first inverter. The terminal of the first inverter and the terminal of the second inverter are adjacent to each other.

10 Claims, 19 Drawing Sheets

(51) Int. Cl.
*H02P 27/08* (2006.01)
*B62D 5/04* (2006.01)

(58) Field of Classification Search
USPC .................................... 310/68 B, 68 R, 114
See application file for complete search history.

(56) References Cited

U.S. PATENT DOCUMENTS

| | | |
|---|---|---|
| 9,389,282 B2 | 7/2016 | Mizuma et al. |
| 2002/0117933 A1* | 8/2002 | Joong .................. B60W 10/08 310/261.1 |
| 2010/0327709 A1* | 12/2010 | Minato .................... H05K 1/18 310/68 D |
| 2016/0036305 A1* | 2/2016 | Kawata ............... B62D 5/0463 180/443 |
| 2018/0093698 A1* | 4/2018 | Urimoto .................. H02K 3/28 |
| 2019/0052154 A1* | 2/2019 | Sugiura ................. H01L 25/07 |
| 2020/0295631 A1* | 9/2020 | Yamashita ........... H02K 11/215 |

\* cited by examiner

MOTOR AND ELECTRIC POWER STEERING DEVICE

CROSS REFERENCE TO RELATED APPLICATIONS

This is a U.S. national stage of PCT Application No. PCT/JP2018/009175, filed on Mar. 9, 2018, and priority under 35 U.S.C. § 119(a) and 35 U.S.C. § 365(b) is claimed from Japanese Application No. 2017-070710, filed Mar. 31, 2017; the entire disclosures of each application are hereby incorporated herein by reference.

1. FIELD OF THE INVENTION

The present disclosure relates to a motor and an electric power steering device.

2. BACKGROUND

Electric motors (hereinafter, simply referred to as "motors"), such as brushless DC motors and AC synchronous motors, and so on are generally driven by a three-phase current. Complex control technologies such as vector control and so on are used to accurately control the waveform of the three-phase current. Such control technologies require high degree of mathematical arithmetic operation and use digital arithmetic circuits such as microcontrollers and so on. Vector control technology has been utilized in applications where the load variation of the motor is large, for example, in the fields of washing machines, electric-assisted bicycles, electric scooters, electric power steering devices, electric vehicles, industrial instruments, and so on. Meanwhile, in a motor having a relatively small output, another motor control method such as a pulse width modulation (PWM) method is adopted.

In the field of vehicle mounting, an electrical control unit (ECU) for automobiles is used for vehicles. The ECU is provided with a microcontroller, a power source, an input/output circuit, an AD converter, a load drive circuit, a ROM (Read Only Memory), and so on. An electronic control system is constructed with the ECU as a core. For example, the ECU processes signals from sensors and thereby controls actuators such as motors, and so on. Specifically, the ECU controls the inverter in the power conversion device while monitoring rotation speed or a torque of the motor. Under the control of the ECU, the power conversion device converts the drive power supplied to the motor.

Recently, an electromechanical integral motor in which a motor, a power conversion device and an ECU are integrated has been developed. High quality assurance is required in terms of safety, in particular, in the field of vehicle mounting. For this reason, a redundancy design has been introduced, which make it possible to continue the safe operation even when a part of a component fails. As an example of a redundancy design, it has been considered to install two power conversion devices with respect to one motor. As another example, it has been considered to install a backup microcontroller in the main microcontroller.

For example, a related art discloses a power conversion device including a control unit and two inverters, the power conversion device for converting power supplied to a three-phase motor. Each of the two inverters is connected to a power source and a ground (hereinafter, referred to as "GND"). One inverter is connected to one end of the three-phase winding of the motor, and the other inverter is connected to the other end of the three-phase winding. Each inverter is provided with a bridge circuit composed of three legs, each leg comprising high-side switching elements and low-side switching elements. When a fault of the switching elements in the two inverters is detected, the control unit switches the motor control at the normal state to the motor control at the abnormal state. In the present specification, "abnormal" mainly means a fault of a switching element. Also, "control at the normal state" means the control in a state in which all the switching elements are normal, and "control at the abnormal state" means the control in a state in which a fault occurs in a certain switching element.

In the control at the abnormal state, a neutral point of the winding is configured in the inverter including a fault switching element among the two inverters (hereinafter, referred to as "a fault inverter") by turning on and off the switching element according to a predetermined rule. According to the rule, in the event of an open fault in which the high-side switching elements are always off, for example, the switching element(s) other than the fault switching element(s), among three high-side switching elements is(are) will be off, and three low-side switching elements will be on in the bridge circuit of the inverter. In this case, the neutral point is configured on the low-side switching side. Also, in the event of a short fault in which the high-side switching elements are always on, the switching element(s) other than the fault switching element(s), among three high-side switching elements is(are) will be on, and three low-side switching elements will be off in the bridge circuit of the inverter. In this case, the neutral point is configured on the high-side switching side. According to the power conversion device of the related art, the neutral point of the three-phase winding is configured in the fault inverter when in the abnormal state. Even if a fault occurs in the switching element, the motor drive can be continued by using the normal inverter.

A drive current for driving a motor flows between two inverters and the winding of each phase. A magnetic field is generated around the conductive wire through which the drive current flows. Electronic components with which the motor is provided operate under the influence of such a magnetic field.

SUMMARY

Example embodiments of the present disclosure provide motors that reduce effects of a magnetic field generated by a drive current on surrounding electronic components, and also provide electric power steering devices including such motors.

An example motor of the present disclosure includes a n-phase (n is an integer equal to or greater than 3) winding, a first inverter electrically connected to one end of the winding of each phase, and a second inverter electrically connected to another end of the winding of each phase. The n-phase winding includes a first-phase winding. The first inverter is provided with a first terminal electrically connected to one end of the first-phase winding. The second inverter is provided with a second terminal electrically connected to another end of the first-phase winding. A current which is output from the first terminal of the first inverter and passes through the first-phase winding flows to the second terminal of the second inverter, and a current which is output from the second terminal of the second inverter output and passes through the first-phase winding flows to the first terminal of the first inverter. The first terminal of the first inverter and the second terminal of the second inverter are disposed adjacently to each other.

The above and other elements, features, steps, characteristics and advantages of the present disclosure will become more apparent from the following detailed description of the example embodiments with reference to the attached drawings.

DETAILED DESCRIPTION

Prior to describing example embodiments of the present disclosure, knowledge and viewpoint of the inventors of the present disclosure, which become basis of the present disclosure, are described.

In an electromechanical integral motor, rotation angle of a rotor is detected by using, for example, a magnetic sensor such as a Hall sensor and a magneto resistance effect element and so on. The magnetic sensor detects rotation angle of a motor by detecting a magnetic field which changes according to rotation of the rotor.

The end portions of each phase winding of the motor are connected to the terminals with which each of the two inverters is provided. When a drive current flows to these terminals, a magnetic field is generated around the terminals. That is, the magnetic sensor detects rotation angle of the rotor under the influence of the magnetic field generated around the terminals of the inverter, and detection accuracy of rotation angle may be sometimes lowered. In an electromechanical integral motor, when accuracy of detection of rotation angle is low, a torque ripple increases or a decrease in output occurs.

There is a need for a motor reducing the effect of the magnetic field generated by a drive current of a motor on surrounding electronic components.

Hereinafter, example embodiments of the motor and the electric power steering device of the present disclosure will be described in details with reference to the attached drawings. However, description which is detailed than necessary may be omitted. For example, detailed description regarding already well-known aspects or duplicate description regarding substantially identical configuration may be omitted. This is to prevent description below from being unnecessarily lengthy and to facilitate understanding by a person skilled in the art.

In the present specification, example embodiments of the present disclosure will be described by taking a three-phase motor having windings of three-phase (U-phase, V-phase, and W-phase) as an example. Meanwhile, n-phase motors having a n-phase (n is an integer greater than or equal to 3) winding, e.g., four-phase winding, five-phase winding, and so on, are also within the scope of the present disclosure.

Figure 1:
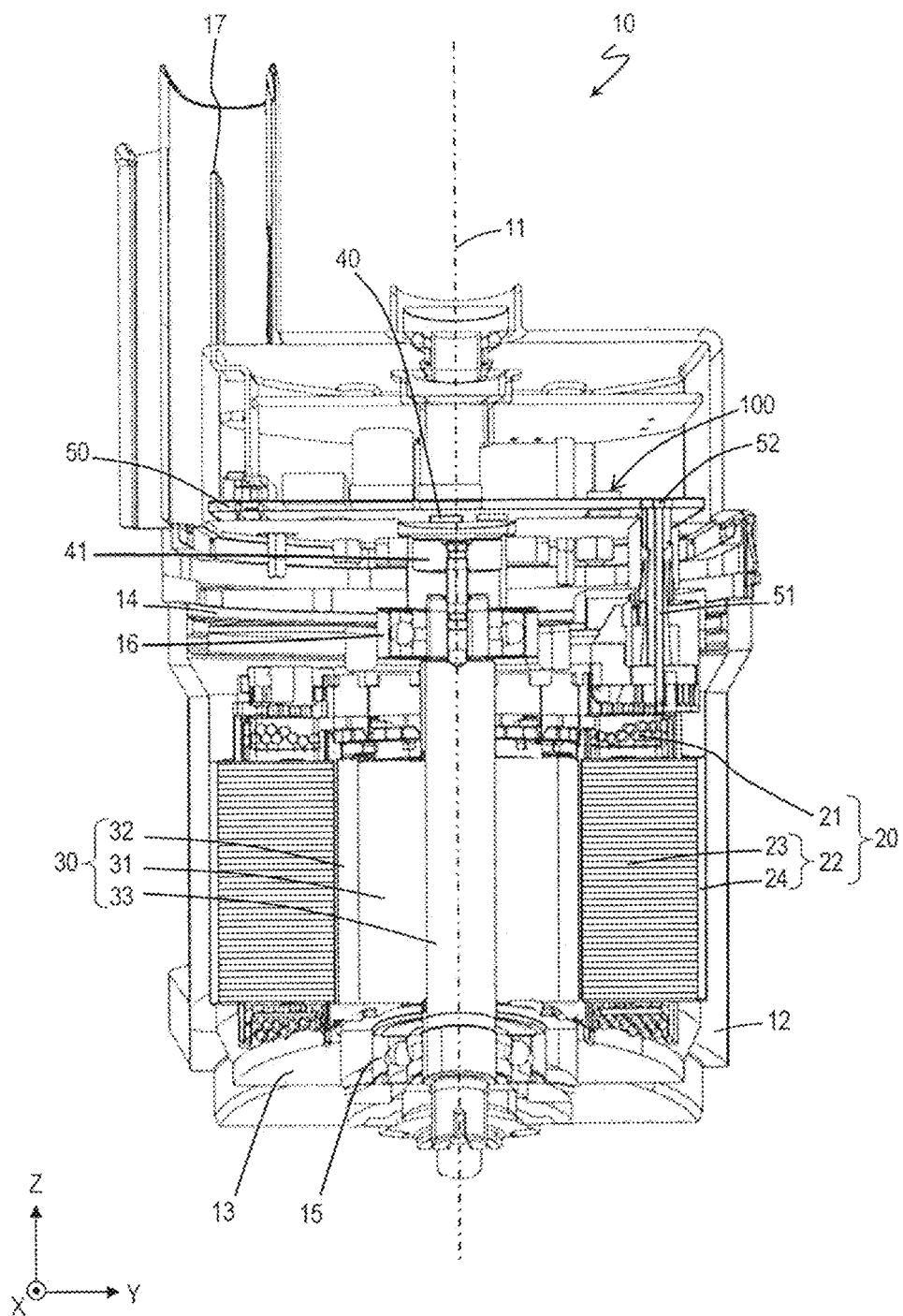
FIG. 1 is a mimetic diagram illustrating structure of a motor according to an example embodiment of the present disclosure.

FIG. 1 is a view illustrating a structure of a motor 10 according to the present example embodiment. FIG. 1 shows the interior of the motor 10 when the motor is cut along a central axis 11.

The motor 10 is an electromechanical integral motor. The motor 10 is mounted on, for example, an automobile, and is used as a motor for an electric power steering device. In this case, the motor 10 generates a drive force of the electric power steering device.

The motor 10 is provided with a stator 20, a rotor 30, a housing 12, a partition wall 14, a bearing 15, and a bearing 16. The stator 20 is also referred to as an armature. The central axis 11 is a rotation axis of the rotor 30.

The housing 12 is an approximately cylindrical case body having a bottom, and houses the stator 20, the bearing 15, and the rotor 30 therein. A recess 13 holding a bearing 15 is positioned at the center of the bottom of the housing 12. The partition wall 14 is a plate-shape member closing an opening in the upper portion of the housing 12. The partition wall 14 holds a bearing 16 at the center portion thereof.

The stator 20 is annular and has a laminated body 22 and a winding 21. The laminated body 22 is also referred to as a laminated annular core. The winding is also referred to as a coil. The stator 20 generates a magnetic flux according to the drive current. The laminated body 22 is composed of a laminated steel sheet in which a plurality of steel sheets are laminated in a direction along the central axis 11 (Z direction in FIG. 1). The lamination body 22 includes an annular laminated core back 24 and a plurality of laminated teeth 23. The laminated core back 24 is fixed to the inner wall of the housing 12.

The winding 21 is composed of a conductive material such as copper and so on, and the winding 21 is typically attached to each of the plurality of laminated teeth 23 of the laminated body 22.

The rotor 30 is provided with a rotor core 31, a plurality of permanent magnets 32 installed along the outer circumference of the rotor core 31, and a shaft 33. The rotor core 31 is composed of a magnetic material, for example, such as iron and so on, and has a cylindrical shape. The plurality of permanent magnets 32 are installed so that the N pole and the S pole appear alternately in the circumferential direction of the rotor core 31. The shaft 33 is fixed to the center of the rotor core 31 and extends in the vertical direction (Z direction) along the central axis 11. Also, in the present specification, upper and lower, and left and right directions refer to upper and lower, and left and right directions in the view of a motor 10 indicated in FIG. 1, and these directions are used to describe example embodiments for easy understanding. It is needless to say that upper and lower, and left and right directions in the present specification do not coincide with upper and lower, and left and right directions in the state in which the motor 10 is mounted on an actual product (an automobile and so on) all the times.

Bearings 15 and 16 rotatably support a shaft 33 of a rotor 30. The bearings 15 and 16 are, for example, ball bearings which rotate the outer ring and the inner ring relative to each other via a sphere body. FIG. 1 illustrates a ball bearing.

In the motor 10, when a drive current flows through the winding 21 of the stator 20, a magnetic flux in the radial direction is generated in the plurality of laminated teeth 23 of the laminated body 22. A torque is generated in the circumferential direction by the action of the magnetic flux between the plurality of laminated teeth 23 and the permanent magnet 32, and the rotor 30 rotates with respect to the stator 20. When the rotor 30 rotates, a drive force is generated in, for example, an electric power steering device.

A permanent magnet 41 is fixed at the end portion of the partition wall 14 side along the shaft 33. The permanent magnet is rotatable together with the rotor 30. A substrate 50 is disposed in the upper portion of the partition wall 14. The power conversion device 100 is mounted on the substrate 50. The partition wall 14 separates a space in which the stator 20 and the rotor 30 in the motor 10 are accommodated from a space in which the substrate 50 is accommodated.

The power conversion device 100 converts electric power from a power source into electric power to be supplied to the winding 21 of the stator 20. A terminal 52 of an inverter with which the power conversion device 100 is provided is installed on a substrate 50. An electric wire 51 is connected to the terminal 52. The electric wire 51 is, for example, an end portion of the winding 21. The electric wire 51 and the winding 21 may be a separate member. The electric power which is output from the power conversion device 100 is supplied to the winding 21 via the electric wire 51. The details of the power conversion device 100 will be described later.

A magnetic sensor 40 is installed on the substrate 50. The magnetic sensor 40 is disposed at a position facing the permanent magnet 41 fixed to the shaft 33. The magnetic sensor 40 is disposed on the central axis 11 of the shaft 33. The magnetic sensor 40 is, for example, a magneto resistance effect element or a Hall element. The magnetic sensor 40 detects a magnetic field generated from the permanent magnet 41 rotating together with the shaft 33, and thereby can detect rotation angle of the rotor 30.

The motor 10 is connected to various kinds of control devices, batteries and so on outside the motor 10 via a plurality of terminals 17. The plurality of terminals 17 include a power source terminal to which electric power is supplied from an external power source, a signal terminal for transmitting and receiving data to and from an external instrument, and so on.

Next, details of the power conversion device 100 will be described.

Figure 2:
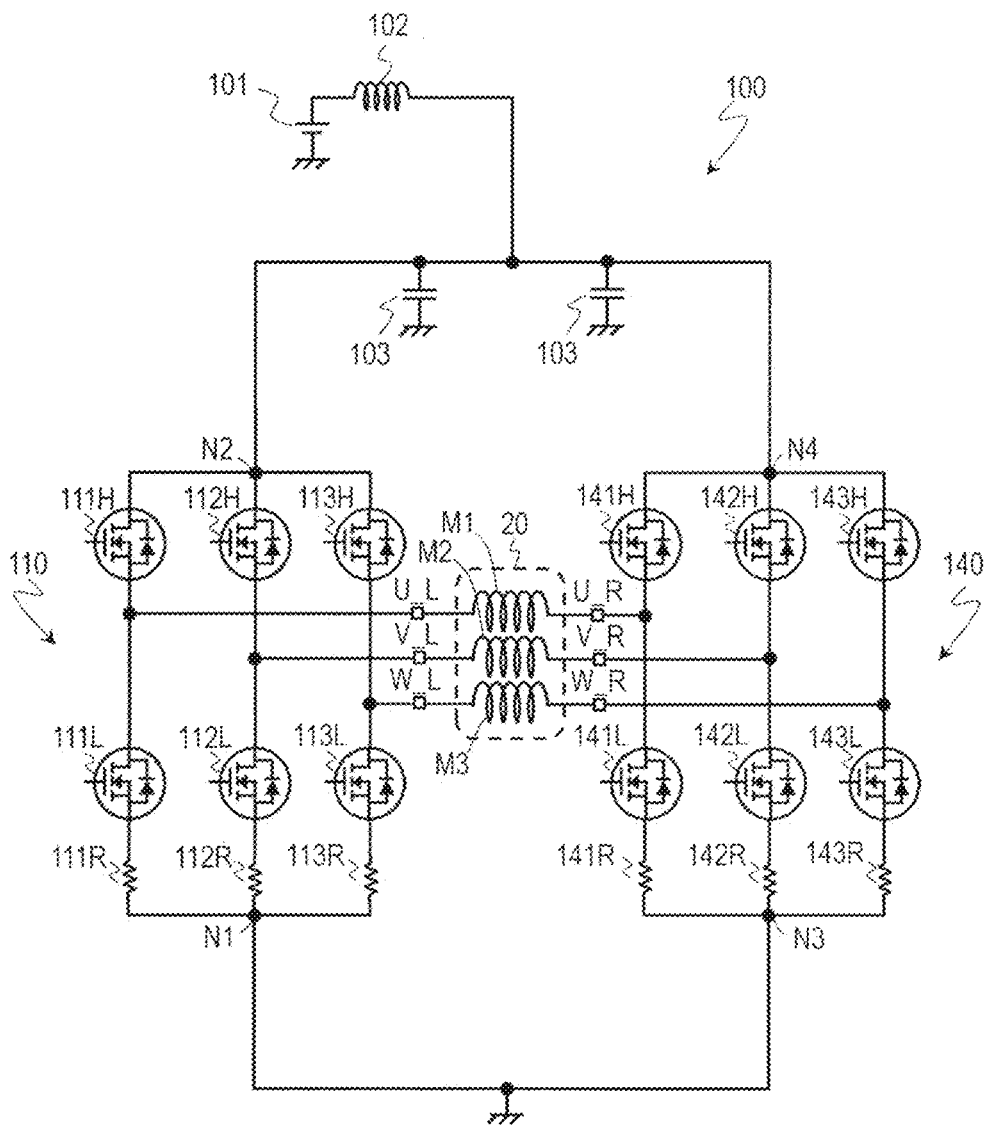
FIG. 2 is a mimetic diagram illustrating a circuit configuration of a power conversion device according to an example embodiment of the present disclosure.

FIG. 2 shows a circuit configuration of the power conversion device 100 mimetically according to the present example embodiment.

The power conversion device 100 is provided with a first inverter 110 and a second inverter 140. Also, the power conversion device 100 is provided with a control circuit 300 shown in FIG. 6.

As the winding 21 (shown in FIG. 1), a U-phase winding M1, a V-phase winding M2, and a W-phase winding M3 are wound around the stator 20. The winding of each phase is connected to a first inverter 110 and a second inverter 140. Specifically, the first inverter 110 is connected to one end of the winding of each phase, and the second inverter 140 is connected to the other end of the winding of each phase. In the present specification, "connection" between components (constitution elements) mainly means electrical connection.

As a terminal 52 (FIG. 1), the first inverter 110 has terminals U_L, V_L, and W_L corresponding to each phase. As a terminal 52, the second inverter 140 has terminals U_R, V_R, and W_R corresponding to each phase. The terminal U_L of the first inverter 110 is connected to one end of the U-phase winding M1, the terminal V_L is connected to one end of the V-phase winding M2, and the terminal W_L is connected to one end of the W-phase winding M3. Similar to the first inverter 110, the terminal U_R of the second inverter 140 is connected to the other end of the U-phase winding M1, the terminal V_R is connected to the other end of the V-phase winding M2, and the terminal W_R is connected to the other end of the W-phase winding M3. Such connections are different from so-called star and delta connections.

In the power conversion device 100, the first inverter 110 and the second inverter 140 are connected to the power source 101 and GND. The motor 10 with the power conversion device 100 being provided can be connected to an external power source, for example, via a terminal 17 (FIG. 1).

In the present specification, the first inverter 110 is sometimes referred to as "a bridge circuit L". Also, the second inverter 140 is sometimes referred to as "a bridge circuit R". Each of the first inverter 110 and the second inverter 140 is provided with three legs, and each leg including low-side switching elements and high-side switching elements. A plurality of switching elements constituting these legs constitute a plurality of H bridges between the first inverter 110 and the second inverter 140 via winding.

The first inverter 110 includes a bridge circuit composed of three legs. The switching elements 111L, 112L, and 113L shown in FIG. 2 are low-side switching elements, and the switching elements 111H, 112H, and 113H shown in FIG. 2 are high-side switching elements. For example, a field-effect transistor (typically MOSFET) or an insulated-gate bipolar transistor (IGBT) can be used as a switching element. In the present specification, an example in which a FET is used as a switching element of an inverter is described, and in the following description, the switching element is sometimes referred to as a FET. For example, the switching element 111L is described as a FET 111L.

The first inverter 110 has three shunt resistors 111R, 112R, and 113R as current sensors (see FIG. 6) for detecting currents flowing through the winding of each phase of the U-phase, the V-phase, and the W-phase. The current sensor 170 includes a current detection circuit (not shown) for detecting a current flowing at each shunt resistor. For example, the shunt resistors 111R, 112R, and 113R are connected between three low-side switching elements included in three legs of the first inverter 110 and GND, respectively. The resistance value of the shunt resistor is, for example, from about 0.5 mΩ to 1.0 mΩ.

Similar to the first inverter 110, the second inverter 140 includes a bridge circuit composed of three legs. FETs 141L, 142L and 143L shown in FIG. 2 are low-side switching elements, and FETs 141H, 142H and 143H shown in FIG. 2 are high-side switching elements. Also, the second inverter 140 is provided with three shunt resistors 141R, 142R, and 143R. These shunt resistors are connected between three low-side switching elements included in the three legs and GND. Each FET of the first and second inverters 110, 140 may be controlled by, for example, a microcontroller or an exclusive driver.

Figure 3:
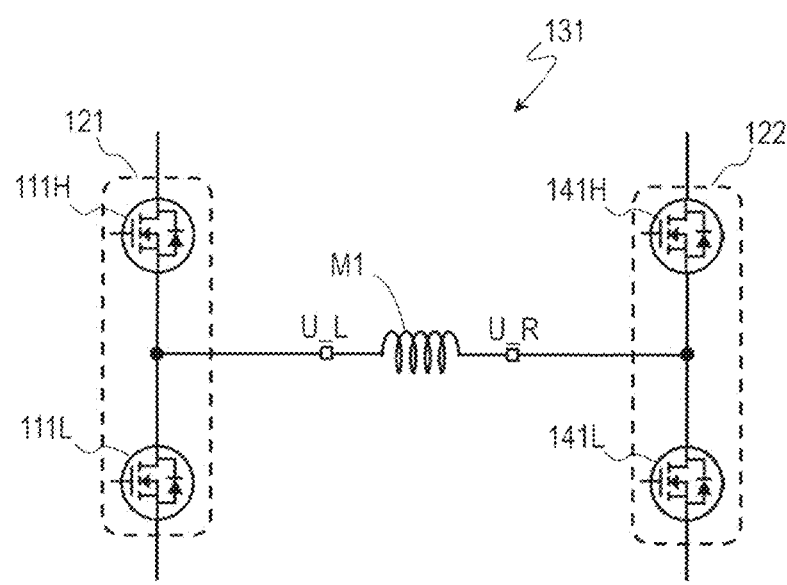
FIG. 3 is a view illustrating an H bridge which a power conversion device has according to an example embodiment of the present disclosure.
Figure 4:
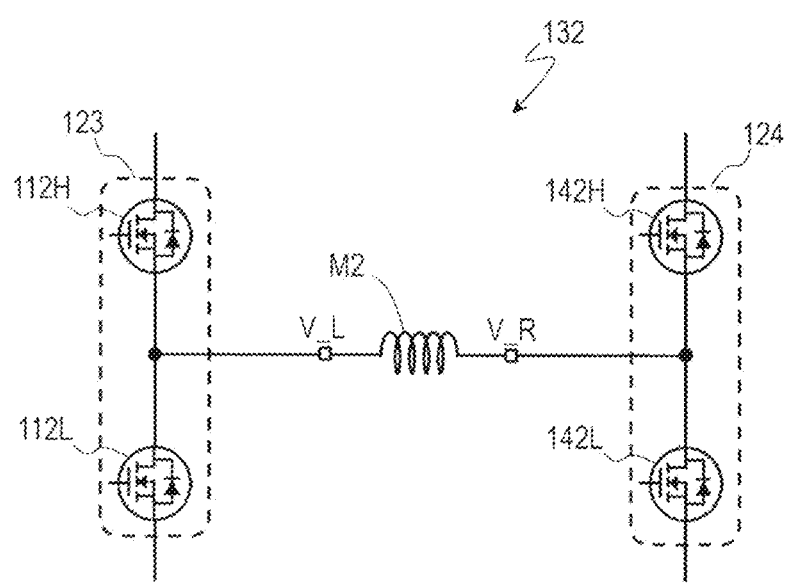
FIG. 4 is a view illustrating an H bridge which a power conversion device has according to an example embodiment of the present disclosure.
Figure 5:
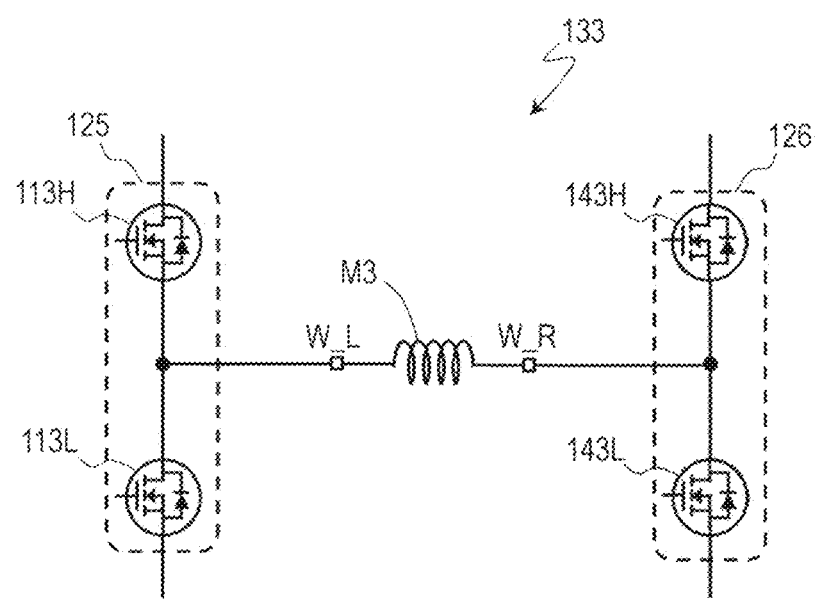
FIG. 5 is a view illustrating an H-bridge which a power conversion device has according to an example embodiment of the present disclosure.

FIG. 3, FIG. 4, and FIG. 5 are views illustrating three H bridges 131, 132, and 133 which the power conversion device 100 has.

The first inverter 110 has legs 121, 123 and 125. A leg 121 has a FET 111H and a FET 111L. A leg 123 has a FET 112H and a FET 112L. A leg 125 has a FET 113H and a FET 113L.

The second inverter 140 has legs 122, 124 and 126. A leg 122 has a FET 141H and a FET 141L. A leg 124 has a FET 142H and a FET 142L. A leg 126 has a FET 143H and a FET 143L.

The H-bridge 131 shown in FIG. 3 has a leg 121, a winding M1, and a leg 122. The H-bridge 132 shown in FIG. 4 has a leg 123, a winding M2, and a leg 124. The H-bridge 133 shown in FIG. 5 has a leg 125, a winding M3, and a leg 126.

The power source 101 (FIG. 2) generates a predetermined power source voltage. Electric power is supplied from the power source 101 to the first and second inverters 110 and 140. For example, a direct current power source is used as the power source 101. Meanwhile, the power source 101 may be either an AC-DC converter or a DC-DC converter, or may be a battery (a storage battery). The power source 101 may be a single power source common to the first and second inverters 110, 140, or may be provided with a first power source for the first inverter 110 and a second power source for the second inverter 140.

A coil 102 is installed between the power source 101 and the power conversion device 100. The coil 102 functions as a noise filter, and smoothes high-frequency noise included in a voltage waveform supplied to each inverter or high-frequency noise generated in each inverter so as not to flow high-frequency noise included in a voltage waveform supplied to each inverter or high-frequency noise generated in each inverter to the power source 101 side. Also, one end of a capacitor 103 is connected between the power source 101 and the power conversion device 100. The other end of the capacitor 103 is connected to GND. The capacitor 103 is a so-called bypass capacitor, and suppresses voltage ripple. The capacitor 103 is, for example, an electrolytic capacitor, and the capacitance and the number of capacitors to be used are appropriately determined according to design specification and so on.

FIG. 2 illustrates a configuration in which one shunt resistor is disposed in each leg of each inverter. The first and second inverters 110, 140 may be provided with six or less shunt resistors. The six or less shunt resistors may be connected between six or less low-side switching elements among six legs with which the first and second inverters 110 and 140 are provided, and GND. Also, applying this to the n-phase motor, the first and second inverters 110, 140 may be provided with 2n or less shunting resistors. 2n or less shunting resistors may be connected between 2n or less low-side switching elements among 2n legs with which the first and second inverters 110, 140 are provided, and GND.

Figure 6:
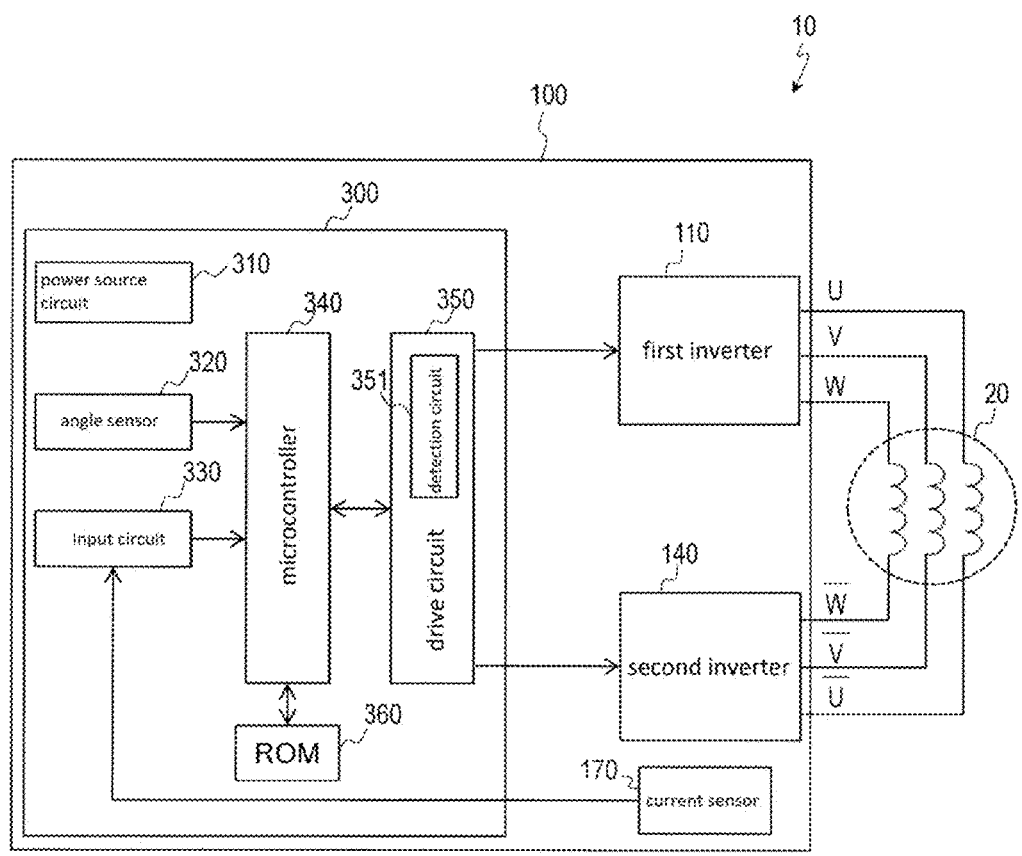
FIG. 6 is a block view illustrating a motor provided with a power conversion device according to an example embodiment of the present disclosure.

FIG. 6 shows a block configuration of the motor 10 including the power conversion device 100 mimetically. The power conversion device 100 is provided with a control circuit 300.

The control circuit 300 has, for example, a power source circuit 310, an angle sensor 320, an input circuit 330, a microcontroller 340, a drive circuit 350, and a ROM 360. In this example, the angle sensor 320 is a magnetic sensor 40 (FIG. 1). The control circuit 300 controls rotation of the motor 10 by controlling the entire operation of the power conversion device 100. Specifically, the control circuit 300 can control the target rotor position, rotation speed, and current and so on and thereby realize closed-loop control. The control circuit 300 may be provided with a torque sensor. In this case, the control circuit 300 can control the target motor torque.

The power source circuit 310 generates DC voltage (e.g., 3V and 5V) required for each block in the circuit. The angle sensor 320 is, for example, a magneto resistance effect element, a resolver, or a Hall IC. The angle sensor 320 detects rotation angle (hereinafter, referred to as "a rotation signal") of the rotor 30 and outputs the rotation signal to the microcontroller 340. The input circuit 330 receives the motor current value detected by the current sensor 170 (hereinafter, referred to as "an actual current value") and, according to its necessity, converts the level of the actual current value into the input level of the microcontroller 340, and outputs the actual current value to the microcontroller 340.

The microcontroller 340 controls the switching operation (turn-on or turn-off) of each FET of the first inverter 110 and the second inverter 140. The microcontroller 340 sets a target current value according to an actual current value, a rotation signal of the rotor and so on, generates a PWM signal, and outputs the PWM signal to the drive circuit 350.

The drive circuit 350 is typically a gate driver. The drive circuit 350 generates a control signal controlling the switching operation of each FET in the first and second inverters 110 and 140 according to the PWM signal, and provides a control signal to the gate of each FET. Also, the microcontroller 340 may have the function of the drive circuit 350. In this case, the control circuit 300 may be not provided with the drive circuit 350.

A ROM 360 is, for example, a writable memory, a re-writable memory, or a read-only memory. The ROM 360 stores control programs including instructions for controlling the power conversion device 100 in the microcontroller 340. For example, first of all, the control program starts to develop in a RAM (not shown) at the time of booting.

The control circuit 300 drives the motor 10 by performing three-phase electrification control using both the first inverter 110 and the second inverter 140. Specifically, the control circuit 300 performs three-phase electrification control by performing switching control of the FET of the first inverter 110 and the FET of the second inverter 140 at inverse phase (the phase difference=180°) each other. For example, focusing on H-bridges including FETs 111L, 111H, 141L, and 141H, when the FET 111L is turned on, the FET 141L is turned off, and when the FET 111L is turned off, the FET 141L is turned on. Likewise, when the FET 111H is turned on, the FET 141H is turned off, and when the FET 111H is turned off, the FET 141H is turned on. The current output from the power source 101 flows to GND by passing through the high-side switching element, the winding, and the low-side switching element. The connection of the power conversion device 100 is sometimes referred to as an open connection.

The path of the current flowing through the U-phase winding M1 will now be described. When the FET 111H and the FET 141L are on and the FET 141H and the FET 111L are off, the current flows through the power source 101, the FET 111H, the winding M1, the FET 141L, and GND in sequence. When the FET 141H and the FET 111L are on and the FET 111H and the FET 141L are off, the current flows through the power source 101, the FET 141H, the winding M1, the FET 111L, and GND in sequence.

Also, a part of the current flowing from the FET 111H to the winding M1 may occasionally flow to the FET 141H. That is, the current flowing from the FET 111H to the winding M1 may branch into the FET 141L and the FET 141H. For example, when the motor 10 rotates at a low speed, the ratio of the current which flows from the FET 111H to the winding M1 and then to the FET 141H occasionally become greater compared with the case when the motor 10 rotates at a high speed.

Likewise, a part of the current flowing from the FET 141H to the winding M1 may occasionally flow to the FET 111H. For example, when the motor 10 rotates at a low speed, the ratio of the current which flows from the FET 141H to the winding M1 and then to the FET 111H occasionally become greater compared with the case when the motor 10 rotates at a high speed.

Next, the path of the current flowing through the V-phase winding M2 will be described. When the FET 112H and the FET 142L are on and the FET 142H and the FET 112L are off, the current flows through the power source 101, the FET 112H, the winding M2, the FET 142L, and GND in sequence. When the FET 142H and the FET 112L are on and the FET 112H and the FET 142L are off, the current flows through the power source 101, the FET 142H, the winding M2, the FET 112L, and GND in sequence.

Also, a part of the current flowing from the FET 112H to the winding M2 may occasionally flow to the FET 142H. For example, when the motor 10 rotates at a low speed, the ratio of the current which flows from the FET 112H to the winding M2 and then to the FET 142H may occasionally become greater compared with the case when the motor 10 rotates at a high speed.

Likewise, a part of the current flowing from the FET 142H to the winding M2 may occasionally flow to the FET 112H. For example, when the motor 10 rotates at a low speed, the ratio of the current which flows from the FET 142H to the winding M2 and then to the FET 112H may occasionally become greater compared with the case when the motor 10 rotates at a high speed.

Next, the path of the current flowing through the W-phase winding M3 will be described. When the FET 113H and the FET 143L are on and the FET 143H and the FET 113L are off, the current flows through the power source 101, the FET 113H, the winding M3, the FET 143L, and GND in sequence. When the FET 143H and the FET 113L are on and the FET 113H and the FET 143L are off, the current flows through the power source 101, the FET 143H, the winding M3, the FET 113L, and GND in sequence.

Also, a part of the current flowing from the FET 113H to the winding M3 may occasionally flow to the FET 143H. For example, when the motor 10 rotates at a low speed, the ratio of the current which flows from the FET 113H to the winding M3 and then to the FET 143H may occasionally become greater compared with the case when the motor 10 rotates at a high speed.

Likewise, a part of the current flowing from the FET 143H to the winding M3 may occasionally flow to the FET 113H. For example, when the motor 10 rotates at a low speed, the ratio of the current which flows from the FET 143H to the winding M3 and then to the FET 113H may occasionally become greater compared with the case when the motor 10 rotates at a high speed.

Figure 7:
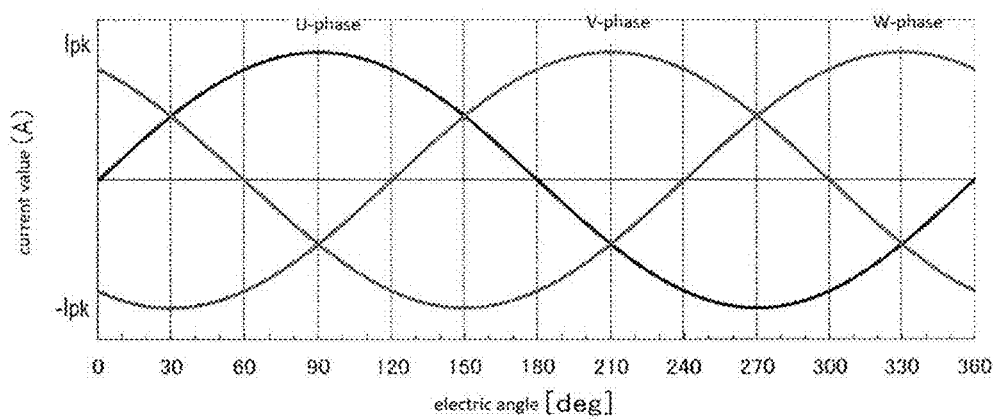
FIG. 7 is a view illustrating current waveforms obtained by plotting the values of the currents flowing through each winding of U-phase, V-phase, and W-phase of a motor when a power conversion device is controlled in accordance with three-phase electrification control at the normal state according to an example embodiment of the present disclosure.

FIG. 7 illustrates a current waveform (sine wave) obtained by plotting values of the current flowing through each of the U-phase, V-phase, and W-phase windings when the power conversion device 100 is controlled according to three-phase electrification control at the normal state. The horizontal axis represents the motor electrical angle (deg), and the vertical axis represents the current value (A). In the current waveform of FIG. 7, the value of the current is plotted per every electrical angle of 30°. $I_{pk}$ represents the maximum current value (peak current value) of each phase.

Table 1 shows the values of the current flowing through the terminals of each inverter per electrical angle in the sine wave of FIG. 7. Specifically, Table 1 shows the values of the currents at every 30 degree of the electrical angle, which flow to the terminals U_L, V_L, and W_L of the first inverter 110 (the bridge circuit L) and the values of the currents at every 30 degree of the electrical angle, which flow to the terminals U_R, V_R, and W_R of the second inverter 140 (the bridge circuit R). With respect to the bridge circuit L, the direction of the current flowing from the terminal of the bridge circuit L to the terminal of the bridge circuit R is defined as a positive direction. The direction of the current shown in FIG. 7 is in accordance with this definition. Also, with respect to the bridge circuit R, the direction of the current flowing from the terminal of the bridge circuit R to the terminal of the bridge circuit L is defined as a positive direction. Therefore, the phase difference between the current of the bridge circuit L and the current of the bridge circuit R becomes 180°. In Table 1, the magnitude of the current value $I_1$ is $[(3)^{1/2}/2]*I_{pk}$, and the magnitude of the current value $I_2$ is $I_{pk}/2$.

TABLE 1

| normal state | | electrical angle [deg] | | | | | | | | | | | |
|---|---|---|---|---|---|---|---|---|---|---|---|---|---|
| | | 0 (360) | 30 | 60 | 90 | 120 | 150 | 180 | 210 | 240 | 270 | 300 | 330 |
| bridge circuit L | U_L | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| bridge circuit R | U_R | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

When electrical angle is 0°, a current does not flow to the U-phase winding M1. A current with magnitude $I_1$ flows from the bridge circuit R to the bridge circuit L in the V-phase winding M2, and a current with magnitude $I_1$ flows from the bridge circuit L to the bridge circuit R in the W-phase winding M3.

When electrical angle is 30°, a current with magnitude $I_2$ flows from the bridge circuit L to the bridge circuit R in the U-phase winding M1, a current with magnitude $I_{pk}$ flows from the bridge circuit R to the bridge circuit L in the V-phase winding M2, and a current with magnitude $I_2$ flows from the bridge circuit L to the bridge circuit R in the W-phase winding M3.

When electrical angle is 60°, a current with magnitude $I_1$ flows from the bridge circuit L to the bridge circuit R in the U-phase winding M1, and a current with magnitude $I_1$ flows from the bridge circuit R to the bridge circuit L in the V-phase winding M2. No current flows through the W-phase winding M3.

When electrical angle is 90°, a current with magnitude $I_{pk}$ flows from the bridge circuit L to the bridge circuit R in the U-phase winding M1, a current with magnitude $I_2$ flows from the bridge circuit R to the bridge circuit L in the V-phase winding M2, and a current with magnitude $I_2$ flows from the bridge circuit R to the bridge circuit L in the W-phase winding M3.

When electrical angle is 120°, a current with magnitude $I_1$ flows from the bridge circuit L to the bridge circuit R in the U-phase winding M1, and a current with magnitude $I_1$ flows from the bridge circuit R to the bridge circuit L in the W-phase winding M3. No current flows through the V-phase winding M2.

When electrical angle is 150°, a current with magnitude $I_2$ flows from the bridge circuit L to the bridge circuit R in the U-phase winding M1, a current with magnitude $I_2$ flows from the bridge circuit L to the bridge circuit R in the V-phase winding M2, and a current with magnitude $I_{pk}$ flows from the bridge circuit R to the bridge circuit L in the W-phase winding M3.

When electrical angle is 180°, no current flows through the U-phase winding M1. A current with magnitude $I_1$ flows from the bridge circuit L to the bridge circuit R in the V-phase winding M2, and a current with magnitude $I_1$ flows from the bridge circuit R to the bridge circuit L in the W-phase winding M3.

When electrical angle is 210°, a current with magnitude $I_2$ flows from the bridge circuit R to the bridge circuit L in the U-phase winding M1, a current with magnitude $I_{pk}$ flows from the bridge circuit L to the bridge circuit R in the V-phase winding M2, and a current with magnitude $I_2$ flows from the bridge circuit R to the bridge circuit L in the W-phase winding M3.

When electrical angle is 240°, a current with magnitude $I_1$ flows from the bridge circuit R to the bridge circuit L in the U-phase winding M1, and a current with magnitude $I_1$ flows from the bridge circuit L to the bridge circuit R in the V-phase winding M2. No current flows through the W-phase winding M3.

When electrical angle is 270°, a current with magnitude $I_{pk}$ flows from the bridge circuit R to the bridge circuit L in the U-phase winding M1, a current with magnitude $I_2$ flows from the bridge circuit L to the bridge circuit R in the V-phase winding M2, and a current with magnitude $I_2$ flows from the bridge circuit L to the bridge circuit R in the W-phase winding M3.

When electrical angle is 300°, a current with magnitude $I_1$ flows from the bridge circuit R to the bridge circuit L in the U-phase winding M1, and a current with magnitude $I_1$ flows from the bridge circuit L to the bridge circuit R in the W-phase winding M3. No current flows through the V-phase winding M2.

When electrical angle is 330°, a current with magnitude $I_2$ flows from the bridge circuit R to the bridge circuit L in the U-phase winding M1, a current with magnitude $I_2$ flows from the bridge circuit R to the bridge circuit L in the V-phase winding M2, and a current with magnitude $I_{pk}$ flows from the bridge circuit L to the bridge circuit R in the W-phase winding M3.

According to the three-phase electrification control of the present example embodiment, the total sum of the currents flowing through the three-phase windings in consideration of the direction of the current is always "0" at every electrical angle. For example, the control circuit 300 controls the switching operation of each FET of the bridge circuits L and R by PWM control in which the current waveform shown in FIG. 7 is obtained.

Next, the disposition positions of the terminals U_L, U_R, V_L, V_R, W_L, and W_R of the first and second inverters 110 and 140 on the substrate 50 (FIG. 1) will be described.

Figure 8:
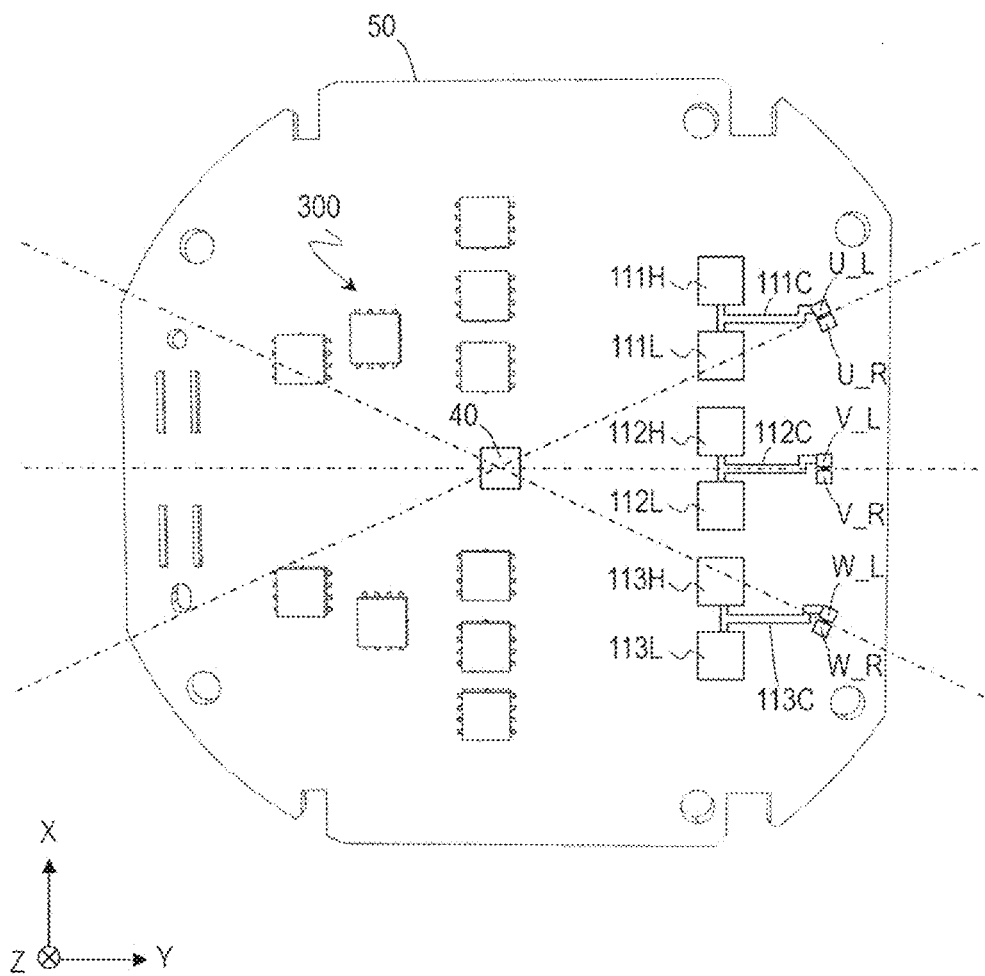
FIG. 8 shows a view illustrating a lower surface of a substrate according to an example embodiment of the present disclosure.
Figure 9:
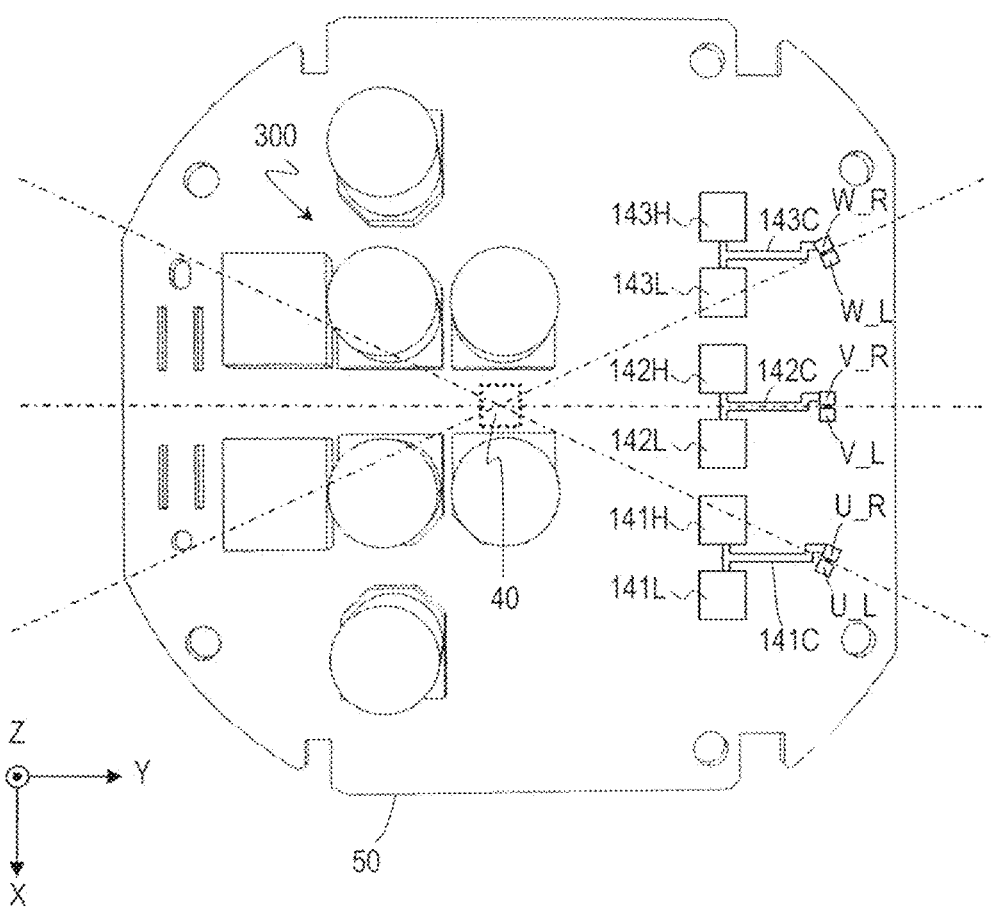
FIG. 9 shows a view illustrating an upper surface of a substrate according to an example embodiment of the present disclosure.

FIG. 8 is a view illustrating the lower surface of the substrate 50, and FIG. 9 is a view illustrating the upper surface of the substrate 50. FIG. 8 illustrates the substrate 50 when the substrate 50 is viewed upwardly from the lower direction in FIG. 1. FIG. 9 illustrates the substrate 50 when the substrate 50 is viewed downwardly from the upper direction in FIG. 1. The power conversion device 100 and other various electronic circuits may be mounted on the substrate 50. In order to describe the features of the present example embodiment for easy understanding, FIGS. 8 and 9 illustrate only some of the components mounted on the substrate 50. In views following FIGS. 8 and 9, only some of the components mounted on the substrate 50 are illustrated in order to describe the features of the present example embodiment for easy understanding.

The FETs 111H, 111L, 112H, 112L, 113H, and 113L of the first inverter 110 are disposed on the lower surface of the substrate 50. The FETs 143H 143L, 142H, 142L, 141H, and 141L of the second inverter 140 are disposed on the upper surface of the substrate 50. The terminals U_L, U_R, V_L, V_R, W_L, and W_R of the first and second inverters 110 and 140 are disposed on the substrate 50. Each terminal may be disposed on the surface of the side in which connected FET is disposed, among the upper surface and the lower surface, and the substrate 50 may be disposed along both sides of the upper surface and the lower surface of the substrate 50 by penetrating the substrate 50 in z direction.

The FETs 111H, 111L and the terminal U_L are connected via a conductive wire 111C. The FETs 112H, 112L and the terminal V_L are connected via a conductive wire 112C. The FETs 113H, 113L and the terminal W_L are connected via a conductive wire 113C.

The FETs 141H, 141L and the terminal U_R are connected via a conductive wire 141C. The FETs 142H, 142L and the terminal V_R are connected via a conductive wire 142C. The FETs 143H, 143L and the terminal W_R are connected via a conductive wire 143C.

Figure 10:
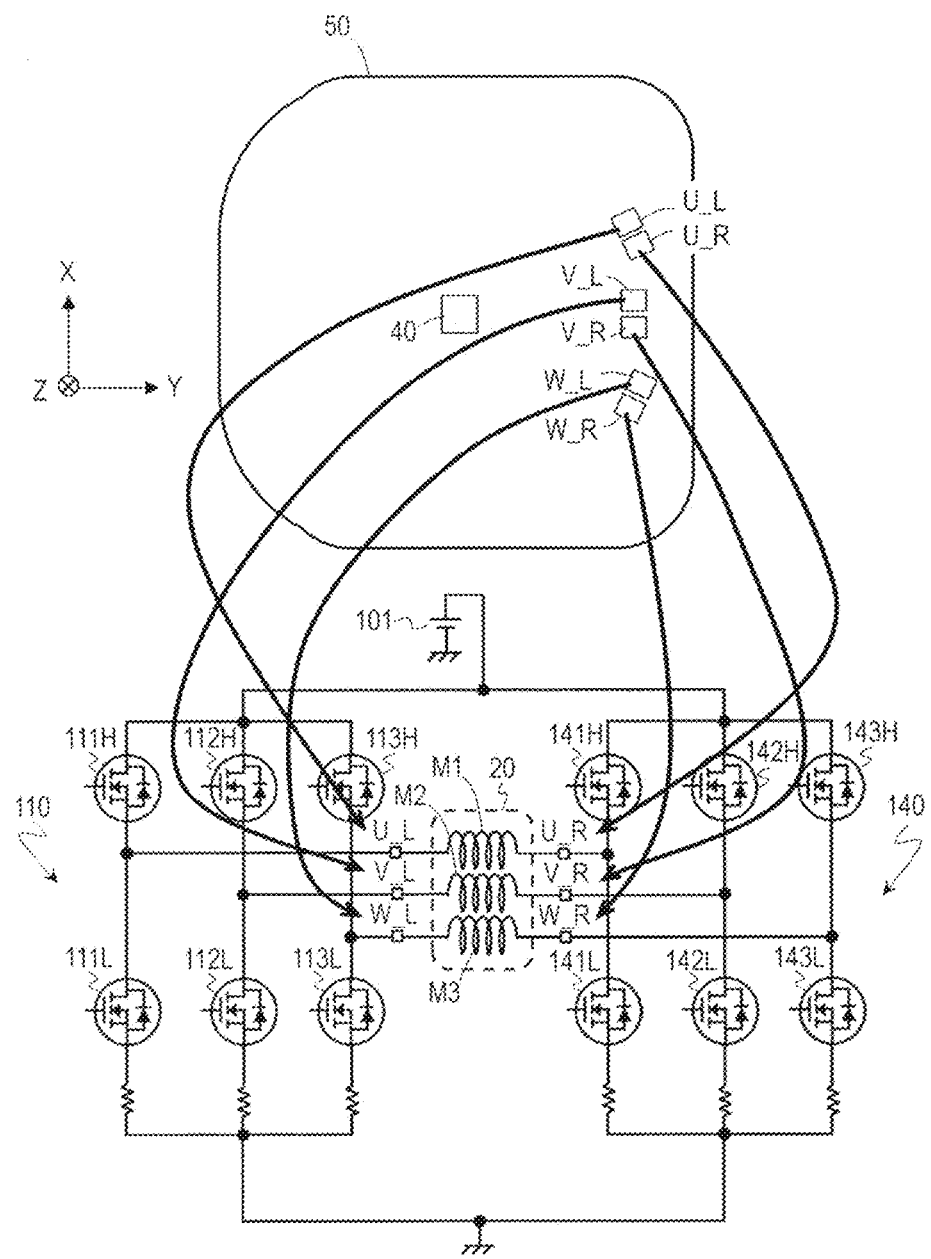
FIG. 10 is a view illustrating corresponding relation between each terminal disposed on a substrate and each terminal in a circuit according to an example embodiment of the present disclosure.

FIG. 10 is a view illustrating corresponding relation between each terminal disposed on the substrate 50 and each terminal in the circuit configuration as shown in FIG. 2. Corresponding relation of the terminals is indicated by bold arrows.

Figure 11:
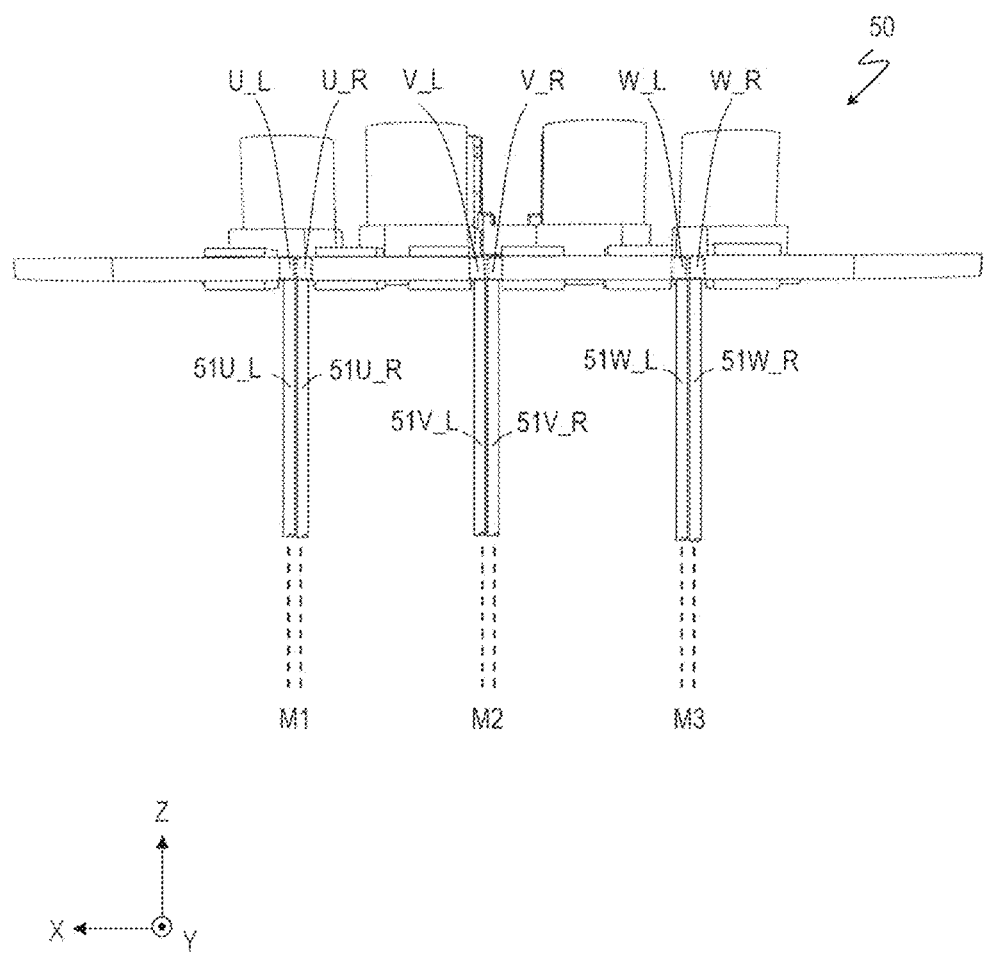
FIG. 11 is a view illustrating a substrate according to an example embodiment of the present disclosure.

FIG. 11 is a view illustrating the substrate 50 as viewed from Y direction. The motor 10 is provided with electric wires 51U_L, 51U_R, 51V_L, 51V_R, 51W_L, and 51W_R as an electric wire 51 (FIG. 1). In this example, the electric wires 51U_L and 51U_R are end portions of the U-phase winding M1. The electric wires 51V_L and 51V_R are end portions of the V-phase winding M2. The electric wires 51W_L and 51W_R are end portions of the W-phase winding M3. Also, each of the electric wires and each of the windings may be a separate member. The electric wire 51U_L is connected to the terminal U_L. The electric wire 51U_R is connected to the terminal U_R. The electric wire 51V_L is connected to the terminal V_L. The electric wire 51V_R is connected to the terminal V_R. The electric wire 51W_L is connected to the terminal W_L. The electric wire 51W_R is connected to the terminal W_R. Also, the electric wire 51 (FIG. 1) may be interpreted as a part of the terminal 52 (FIG. 1). That is, terminals in the present specification may include the meaning of electrical wires extending from the stator 20 to the substrate 50. In this case, the electric wire 51U_L is included in the terminal U_L. The electric wire 51U_R is included in the terminal U_R. The electric wire 51V_L is included in terminal V_L. The electric wire 51V_R is included in terminal V_R. The electric wire 51W_L is included in the terminal W_L. The electric wire 51W_R is included in the terminal W_R.

The flow of the current in the motor 10 will be described by referring to FIGS. 2, 10 and 11.

First of all, the current flowing through the U-phase winding M1 will be described. When the FET 111H and the FET 141L are on and the FET 141H and the FET 111L are off, the current which is output from the terminal U_L of the first inverter 110 and passes through the U-phase winding M1 flows to the terminal U_R of the second inverter 140. When the FET 141H and the FET 111L are on and the FET 111H and the FET 141L are off, the current which is output from the terminal U_R of the second inverter 140 and passes through the U-phase winding M1 flows to the terminal U_L of the first inverter 110.

As described above, the current flowing through the terminal U_L of the first inverter 110 and the current flowing through the terminal U_R of the second inverter 140 are equal in magnitude and opposite in direction. That is, the magnetic field generated by the current flowing through the terminal U_L and the magnetic field generated by the current flowing through the terminal U_R are equal in magnitude and in opposite direction. In the present example embodiment, the terminal U_L and the terminal U_R are disposed adjacent to each other on the substrate 50. For this reason, the magnetic fields which have the same magnitude and are opposite in direction are offset by each other. As a result, the influence of the magnetic fields generated by the currents flowing through the terminal U_L and the terminal U_R on surrounding electronic components can be reduced. For example, the influence of the magnetic fields generated by the currents flowing through the terminal U_L and the terminal U_R on the magnetic sensor 40 can be reduced. As a result, detection accuracy of the magnetic sensor can be increased, and an increase in torque ripple or a decrease in output can be prevented.

Also, the expression "the terminals are adjacent to each other" indicates, for example, that these terminals are in close position relation compared with terminals of the other phase. In addition, the meaning of "adjacent" does not exclude the case in which another component is disposed between the terminals in close position relation. As an example of disposition, the terminals of the same phase are disposed as close as possible so as to effectively offset magnetic field by each other.

Furthermore, as the terminal U_L and the terminal U_R are disposed adjacent to each other, the electric wire 51U_L and the electric wire 51U_R are disposed adjacent to each other. For this reason, the magnetic fields generated from the currents flowing through the electric wires 51U_L and 51U_R are also offset by each other. As a result, the influence of the generated magnetic fields on surrounding electronic components can be reduced. For example, the influence of the generated magnetic field on the magnetic sensor 40 can be reduced.

Next, the current flowing through the V-phase winding M2 will be described. When the FET 112H and the FET 142L are on and the FET 142H and the FET 112L are off, the current which is output from the terminal V_L of the first inverter 110 and passes through the V-phase winding M2 flows to the terminal V_R of the second inverter 140. When the FET 142H and the FET 112L are on and the FET 112H and the FET 142L are off, the current which is output from the terminal V_R of the second inverter 140 and passes through the V-phase winding M2 flows to the terminal V_L of the first inverter 110.

The current flowing through the terminal V_L of the first inverter 110 and the current flowing through the terminal V_R of the second inverter 140 are equal in magnitude and opposite in direction. In the present example embodiment, the terminal V_L and the terminal V_R are adjacent to each other on the substrate 50. As described above, the magnetic fields which have the same magnitude and are opposite in direction are offset by each other. As a result, the influence of the magnetic fields generated by the currents flowing through the terminal V_L and the terminal V_R on surrounding electronic components can be reduced. For example, the influence of the magnetic fields generated by the currents flowing through the terminal U_L and the terminal U_R on the magnetic sensor 40 can be reduced.

Also, as the terminal V_L and the terminal V_R are disposed adjacent to each other, the electric wire 51V_L and the electric wire 51V_R are disposed adjacent to each other. For this reason, the magnetic fields generated by the currents flowing through the electric wire 51V_L and the electric wire 51V_R are also offset by each other. As a result, the influence of the generated magnetic field on surrounding electronic components can be reduced. For example, the influence of the generated magnetic field on the magnetic sensor 40 can be reduced.

Next, the current flowing through the W-phase winding M3 will be described. When the FET 113H and the FET 143L are on and the FET 143H and the FET 113L are off, the current which is output from the terminal W_L of the first inverter 110 and passes through the W-phase winding M3 flows to the terminal W_R of the second inverter 140. When the FET 143H and the FET 113L are on and the FET 113H and the FET 143L are off, the current which is output from the terminal W_R of the second inverter 140 and passes through the W-phase winding M3 flows to the terminal W_L of the first inverter 110.

The current flowing through the terminal W_L of the first inverter 110 and the current flowing through the terminal W_R of the second inverter 140 are equal in magnitude and opposite in direction. In the present example embodiment, the terminal W_L and the terminal W_R are disposed adjacent to each other on the substrate 50. Likewise above, the magnetic fields which have the same magnitude and opposite in direction are offset by each other. As a result, the influence of the magnetic fields generated by the currents flowing through the terminal W_L and the terminal W_R on surrounding electronic components can be reduced. For example, the influence of the magnetic fields generated by the currents flowing through the terminal U_L and the terminal U_R on the magnetic sensor 40 can be reduced.

Furthermore, as the terminal W_L and the terminal W_R are disposed adjacent to each other, the electric wire 51W_L and the electric wire 51W_R are disposed adjacent to each other. For this reason, the magnetic fields generated from the currents flowing through the electric wires 51W_L and 51W_R are also offset by each other. As a result, the influence of the generated magnetic field on surrounding electronic components can be reduced. For example, the influence of the generated magnetic field on the magnetic sensor 40 can be reduced.

Figure 12:
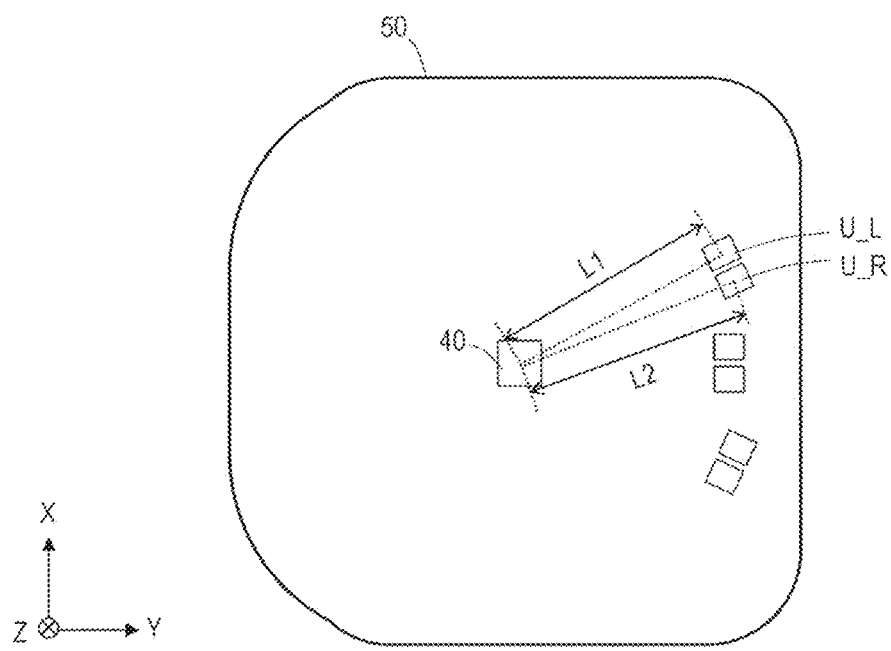
FIG. 12 is a view illustrating the distance between a terminal and a magnetic sensor according to an example embodiment of the present disclosure.
Figure 13:
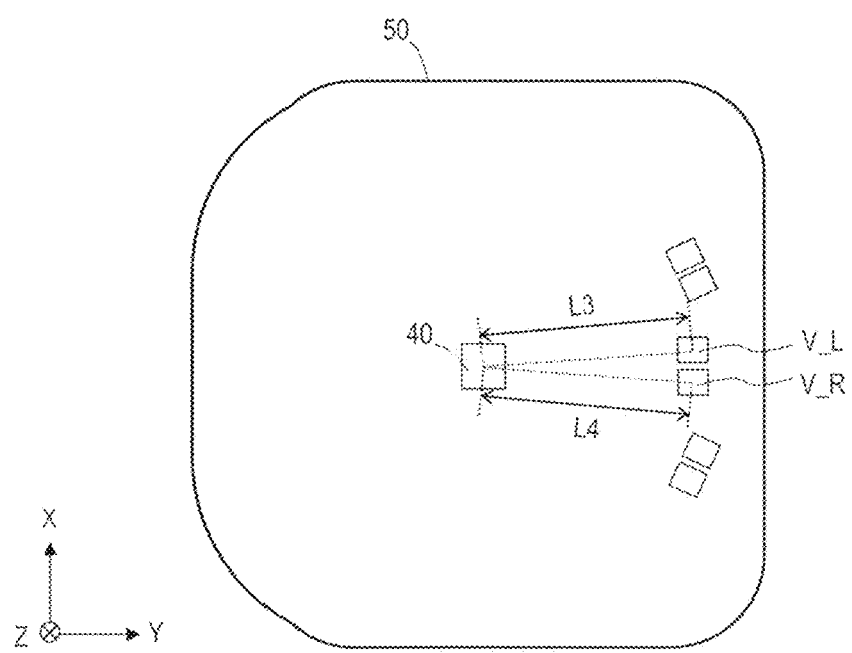
FIG. 13 is a view illustrating the distance between a terminal and a magnetic sensor according to an example embodiment of the present disclosure.
Figure 14:
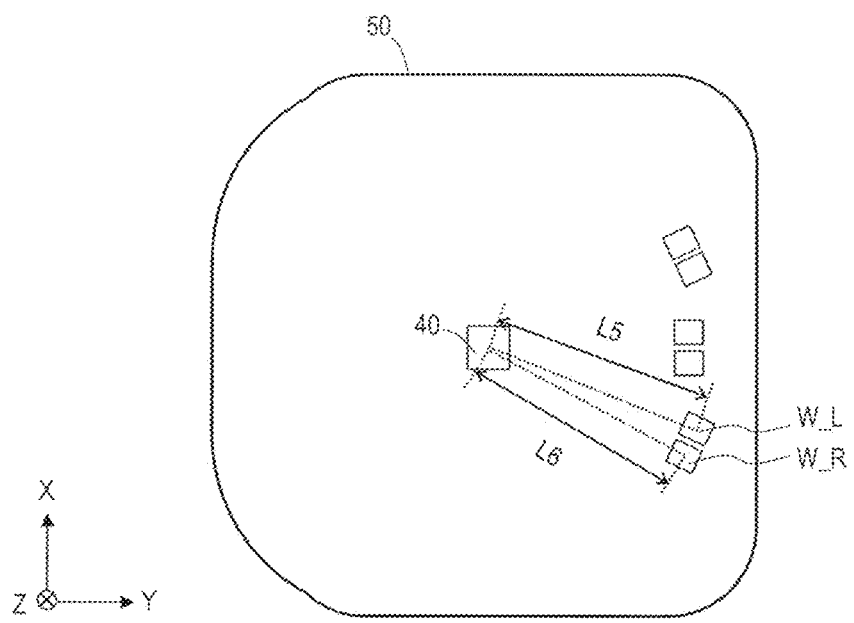
FIG. 14 is a view illustrating the distance between a terminal and a magnetic sensor according to an example embodiment of the present disclosure.

FIG. 12, FIG. 13, and FIG. 14 are views illustrating the distance between the terminal and the magnetic sensor 40.

As shown in FIG. 12, in the present example embodiment, the terminal U_L and the terminal U_R are disposed on the substrate 50 so that the distance L1 between the terminal U_L and the magnetic sensor 40 and the distance L2 between the terminal U_R and the magnetic sensor 40 become equal. As a result, the influence of the magnetic fields generated by the currents flowing through the terminal U_L and the terminal U_R on the magnetic sensor 40 can be further reduced.

Likewise, as shown in FIG. 13, in the present example embodiment, the terminal V_L and the terminal V_R are disposed on the substrate 50 so that the distance L3 between the terminal V_L and the magnetic sensor 40 and the distance L4 between the terminal V_R and the magnetic sensor 40 becomes equal. As a result, the influence of the magnetic fields generated by the currents flowing through the terminal V_L and the terminal V_R on the magnetic sensor 40 can be further reduced. Also, as shown in FIG. 14, the terminal W_L and the terminal W_R are disposed on the substrate 50 so that the distance L5 between the terminal W_L and the magnetic sensor 40 and the distance L6 between the terminal W_R and the magnetic sensor 40. As a result, the influence of the magnetic fields generated by the currents flowing through the terminal W_L and the terminal W_R on the magnetic sensor 40 can be further reduced.

Figure 15:
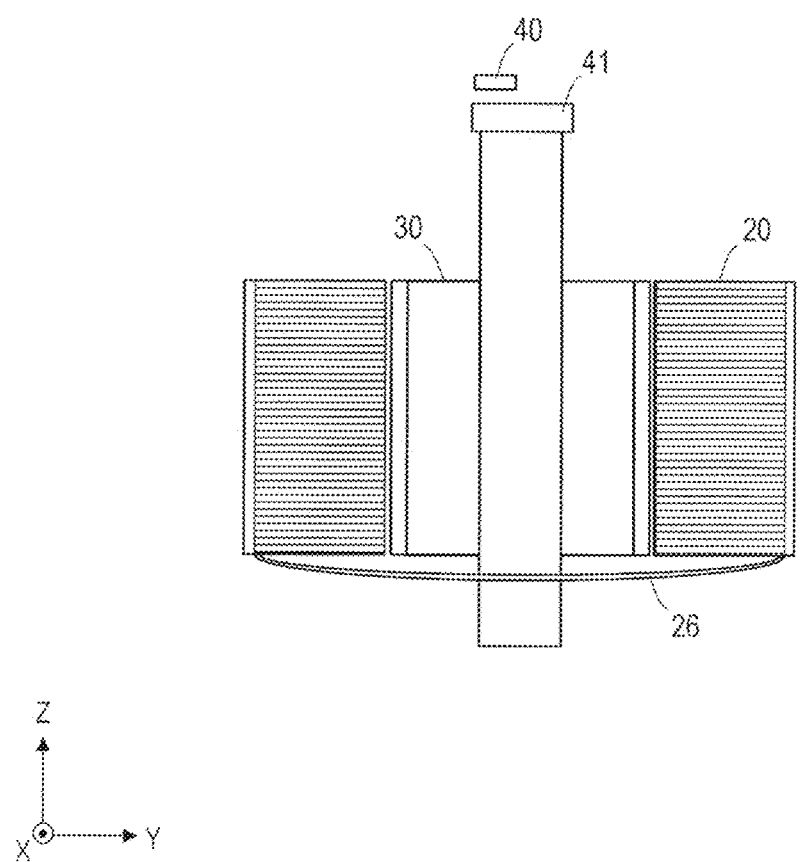
FIG. 15 is a view illustrating a disposition position of a crossover wire with which a stator is provided according to an example embodiment of the present disclosure.

FIG. 15 is a view illustrating an example of disposition position of a crossover wire 26 with which the stator 20 is provided. The windings of each phase are wound around the stator 20 using the crossover wire 26. In the laminated teeth 23 of the same phase among a plurality of laminated teeth 23 (FIG. 1) with which the stator 20 is provided, the same phase winding is wound. The crossover wire 26 connects the n-windings each other, which are wound in the plurality of laminated teeth 23 of the n-phase.

In the present example embodiment, the magnetic sensor 40 and the crossover wire 26 are disposed opposite to each other when viewed from the stator 20. In FIG. 15, the magnetic sensor 40 is disposed in the upper direction of the stator 20, and the crossover wire 26 is disposed on the lower side of the stator 20. If the crossover wire 26 is disposed on the upper side of the stator 20, the magnetic field generated by the current flowing through the crossover wire 26 may occasionally affect the magnetic sensor 40. In the present example embodiment, the crossover wire 26 is disposed on the lower side of the stator 20. That is, the magnetic sensor 40 and the crossover line 26 are disposed apart from each other. For this reason, the influence of the magnetic field generated by the current flowing through the crossover wire 26 on the magnetic sensor 40 can be reduced.

Figure 16:
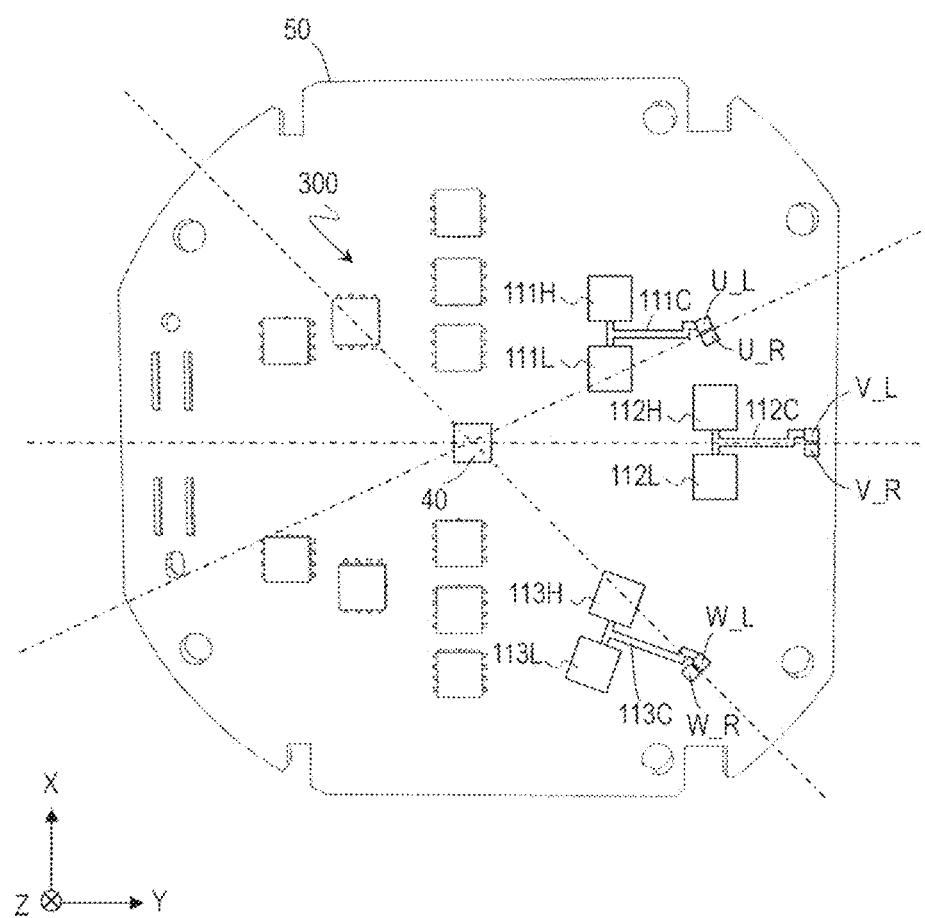
FIG. 16 is a view illustrating another example for disposition positions of terminals on a substrate according to an example embodiment of the present disclosure.

FIG. 16 is a view illustrating another example of the disposition positions of the terminals U_L, U_R, V_L, V_R, W_L, and W_R on the substrate 50. In the example shown in FIG. 16, the distance between the terminals U_L and U_R, and the magnetic sensor 40, the distance between the terminals V_L and V_R, and the magnetic sensor 40, and the distance between the terminals W_L and W_R, and the magnetic sensor 40 are different from each other. In the present example embodiment, the magnetic fields may be offset by making the terminals of the same phase to be adjacent. The positions of the terminals of which phases are different from each other can be arbitrarily determined as long as the relation in which the terminals of the same phase become adjacent to each other is maintained. For this reason, the degree of freedom in disposing various kinds of electronic components mounted on the substrate 50 can be improved.

Figure 17:
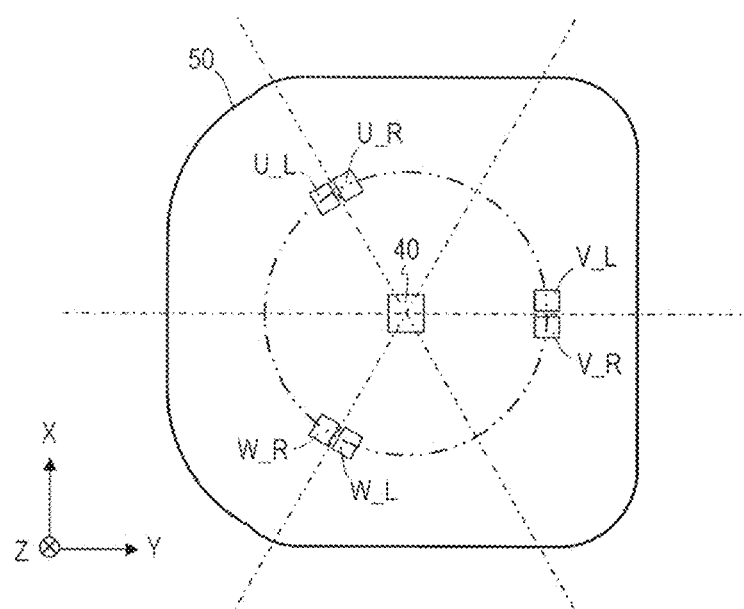
FIG. 17 is a view illustrating still another example of disposition positions of terminals on a substrate according to an example embodiment of the present disclosure.
Figure 18:
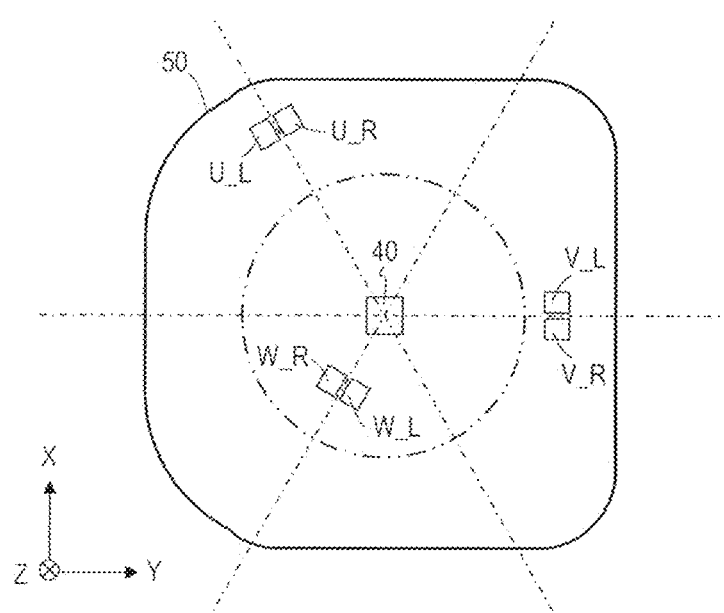
FIG. 18 is a view illustrating still another example of disposition positions of terminals on a substrate according to an example embodiment of the present disclosure.

FIGS. 17 and 18 are views illustrating another example of the disposition positions of the terminals U_L, U_R, V_L, V_R, W_L, and W_R on the substrate 50. In the example shown in FIG. 17, the terminals U_L and U_R, the terminals V_L and V_R, and the terminals W_L and W_R are disposed at interval of 120° on a concentric circle centered on the magnetic sensor 40. In the example shown in FIG. 18, each distance between the magnetic sensor 40 and the terminals of each phase is different from each other. In the present example embodiment, the degree of freedom in disposing various kinds of electronic components mounted on the substrate 50 can be improved.

In addition, similar to the related art, when the fault of the switching elements in the two inverters is detected, the motor control may be switched from the control in the normal state to the control in the abnormal state. In the control in the abnormal state, a neutral point of the winding is configured in the fault inverter by turning on and off the switching elements according to a predetermined rule. The motor drive can be continued by using the neutral point and the inverter in the normal state. Also, in the control using such a neutral point, currents which have the same magnitude and are opposite in direction flow through terminals of the same phase adjacent to each other in the present example embodiment. As the terminals of the same phase are adjacent to each other, the generated magnetic fields are offset by each out. In the present example embodiment, in the control at the abnormal state, the influence of the magnetic field generated by the current flowing through the terminal on surrounding electronic components can be reduced.

A vehicle such as an automobile is generally provided with an electric power steering device.

The electric power steering device generates an auxiliary torque for assisting the steering torque of the steering system, which is generated by a driver when operating the steering wheel. The auxiliary torque is generated by the auxiliary torque mechanism, and burden on the operation of the driver can be reduced. For example, the auxiliary torque mechanism is provided with a steering torque sensor, an ECU, a motor, a speed reduction mechanism and so on. The steering torque sensor detects a steering torque in the steering system. The ECU generates a drive signal based on a detection signal of the steering torque sensor. The motor generates an auxiliary torque according to the steering torque based on the drive signal, and transmits the auxiliary torque to the steering system via the speed reduction mechanism.

Figure 19:
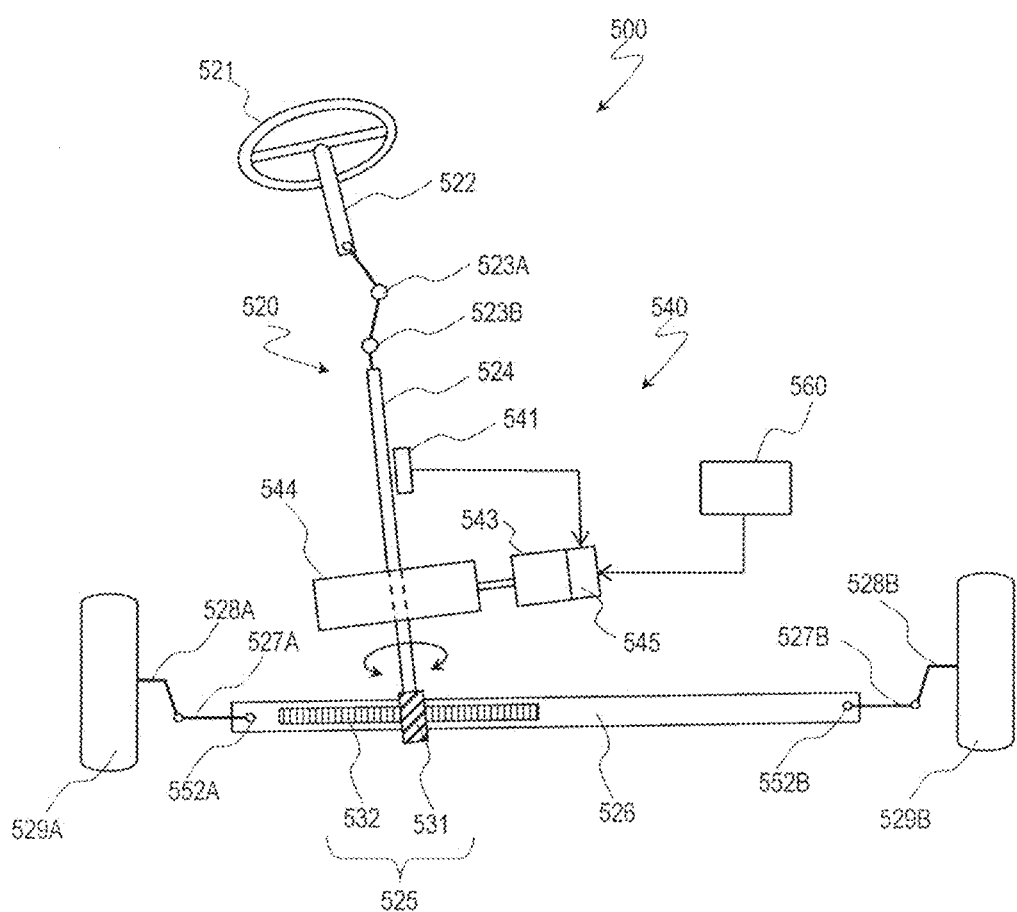
FIG. 19 is a mimetic diagram illustrating an electric power steering device according to an example embodiment of the present disclosure.

The motor 10 of the present disclosure is suitably used in an electric power steering device. FIG. 19 shows an electric power steering device 500 mimetically according to the present example embodiment. The electric power steering device 500 is provided with a steering system 520 and an auxiliary torque mechanism 540.

The steering system 520 includes, for example, a steering handle 521, a steering shaft 522 (also referred to as "a steering column"), universal joints 523A and 523B, a rotation shaft 524 (also referred to as "a pinion shaft" or "an input shaft"), a rack and pinion mechanism 525, a rack shaft 526, left and right ball joints 552A and 552B, tie rods 527A and 527B, knuckles 528A and 528B, and left and right steering wheels (e.g., left and right front wheels) 529A and 529B. The steering handle 521 is connected to the rotation shaft 524 via the steering shaft 522 and the universal joints 523A and 523B. The rack shaft 526 is connected to the rotation shaft 524 via a rack and pinion mechanism 525. The rack and pinion mechanism 525 includes a pinion 531 installed on the rotation shaft 524 and a rack 532 installed on the rack shaft 526. A ball joint 552A, a tie rod 527A, and a knuckle 528A are interposed in sequence from the right end of the rack shaft 526 to a right steering wheel 529A which thereby is connected to the right end of the rack shaft 526. Similar to the right side, a ball joint 552B, a tie rod 527B, and a knuckle 528B are interposed in sequence from the left end of the rack shaft 526 to a left steering wheel 529B which thereby is connected to the left end of the rack shaft 526. In FIG. 19, the right side and the left side coincide with the right side and the left side, respectively, as viewed from the driver in the seat.

According to the steering system 520, a steering torque is generated by a driver operating the steering wheel 521, and is transmitted to the left and right steering wheels 529A and 529B via the rack and pinion mechanism 525. As a result, the driver can operate the left and right steering wheels 529A and 529B.

The auxiliary torque mechanism 540 is provided with, for example, a steering torque sensor 541, an electromechanical integral motor 543, and a speed reduction mechanism 544. The auxiliary torque mechanism 540 applies an auxiliary torque to the steering system 520 encompassing the steering wheel 521 and the left and right steering wheels 529A and 529B. Also, the auxiliary torque is sometimes referred to as "an additional torque".

The motor 10 according to the example embodiment can be suitably used as the electromechanical integral motor 543. The electromechanical integral motor 543 is provided with a power conversion device 545. The power conversion device 100 according to the example embodiment can be used as the power conversion device 545. In addition, the control circuit 300 according to the example embodiment can be used as an ECU.

The steering torque sensor 541 detects the steering torque of the steering system 520, which is provided by the steering wheel 521. The control circuit 300 generates a drive signal for driving the motor 543 based on a detection signal (hereinafter, referred to as "a torque signal") from the steering torque sensor 541. The motor 543 generates an auxiliary torque according to the steering torque based on the drive signal. The auxiliary torque is transmitted to the rotation shaft 524 of the steering system 520 via the speed reduction mechanism 544. The reduction mechanism 544 is, for example, a worm gear mechanism. Also, the auxiliary torque is transmitted from the rotation shaft 524 to the rack and pinion mechanism 525.

The electric power steering device 500 can be classified into a pinion-assisted type, a rack-assisted type, a column-assisted type and so on according to a position where the auxiliary torque is provided in the steering system 520. FIG. 19 illustrates a pinion-assisted electric power steering device 500. However, the electric power steering device 500 may be a rack-assisted type, a column-assisted type and so on.

Not only a torque signal but also, for example, a vehicle speed signal can be input to the control circuit 300. An external instrument 560 is, for example, a vehicle speed sensor. Also, the external instrument 560 may be another ECU capable of communicating by in-vehicle networks such as the CAN (Controller Area Network). The microcontroller of the control circuit 300 can perform vector control or PWM control of the motor 543 based on a torque signal, a vehicle speed signal, and so on.

The control circuit 300 sets a target current value based on at least a torque signal. It is preferable that the control circuit 300 sets the target current value in consideration of the vehicle speed signal detected by the vehicle speed sensor, and the rotation signal of the rotor detected by the angle sensor 320. The control circuit 300 can control the drive signal of the motor 543, i.e., the drive current so that the actual current value detected by the current sensor 170 coincides with the target current value.

According to the electric power steering device 500, the left and right steering wheels 529A and 529B can be operated by the rack shaft 526 using the complex torque obtained by adding the auxiliary torque of the motor 543 to the steering torque of the driver.

Example embodiments according to the present disclosure have been described above. The foregoing description of the example embodiments is by way of example, and does not limit the technologies of the present disclosure. In addition, an example embodiment in which each constitution element described in the above example embodiment is appropriately combined is also available.

Example embodiments of the present disclosure may be widely utilized in a variety of instruments including various kinds of motors of cleaners, dryers, sealing fans, washing machines, refrigerators, and electric power steering devices and so on.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
    an n-phase winding, n being an integer equal to or greater than 3;
    a first inverter electrically connected to a first end of the winding of each phase; and
    a second inverter electrically connected to a second end of the winding of each phase; wherein
    the n-phase winding includes a first-phase winding;
    the first inverter includes a first terminal electrically connected to the first end of the winding of the first-phase,
    the second inverter includes a second terminal electrically connected to the second end of the winding of the first-phase;
    a current output from the first terminal of the first inverter and passing through the first-phase winding flows to the second terminal of the second inverter;
    a current output from the second terminal of the second inverter and passing through the first-phase winding flows to the first terminal of the first inverter;
    the n-phase winding includes a second-phase winding;
    the first inverter is provided with a third terminal electrically connected to the first end of the winding of the second-phase;
    the second inverter is provided with a fourth terminal electrically connected to the second end of the winding of the second-phase;
    a current output from the third terminal of the first inverter and passing through the second-phase winding, flows to the fourth terminal of the second inverter;
    a current output from the fourth terminal of the second inverter and passing through the second-phase winding, flows to the third terminal of the first inverter;
    the n-phase winding includes a third-phase winding:
    the first inverter includes a fifth terminal electrically connected to the first end of the winding of the third-phase;
    the second inverter includes a sixth terminal electrically connected to the second end of the winding of the third-phase;
    a current output from the fifth terminal of the first inverter and through the third-phase winding flows to the sixth terminal of the second inverter:
    a current output from the sixth terminal of the second inverter and passing through the third-base winding flows to the fifth terminal of the first inverter; and
    a distance between the first terminal of the first inverter and the second terminal of the second inverter is shorter than (i) a distance between the first terminal of the first inverter and all remaining terminals except for the second terminal of the second inverter, or (ii) a distance between the second terminal of the second inverter and all remaining terminals except for the first terminal of the first inverter.

2. The motor of claim 1, wherein the currents respectively flowing through the first terminal of the first inverter and the second terminal of the second inverter are equal or substantially equal in magnitude and are opposite in direction.

3. The motor of claim 1, further comprising:
    a rotor; and
    a magnetic sensor to detect a rotation angle of the rotor; wherein
    a distance between the first terminal and the magnetic sensor and a distance between the second terminal and the magnetic sensor are equal or substantially equal.

4. The motor of claim 1, wherein the currents respectively flowing through the third terminal of the first inverter, and the fourth terminal of the second inverter are equal or substantially equal in magnitude and opposite in direction.

5. The motor of claim 1, further comprising:
    a rotor; and
    a magnetic sensor to detect a rotation angle of the rotor; wherein a distance between the first terminal and the magnetic sensor and a distance between the second terminal and the magnetic sensor are equal or substantially equal; and
    a distance between the third terminal and the magnetic sensor and a distance between the fourth terminal and the magnetic sensor are equal or substantially equal.

6. The motor of claim 1, further comprising:
    a rotor; and
    a magnetic sensor to detect a rotation angle of the rotor; wherein
    a distance between the first terminal and the magnetic sensor and a distance between the third terminal and the magnetic sensor are different from each other; and
    a distance between the second terminal and the magnetic sensor and a distance between the fourth terminal and the magnetic sensor are different from each other.

7. The motor of claim 1, wherein the currents respectively flowing through the fifth terminal of the first inverter, and the sixth terminal of the second inverter are equal or substantially equal in magnitude and opposite in direction.

8. The motor of claim 1, further comprising:
    a rotor; and
    a magnetic sensor to detect a rotation angle of the rotor; wherein
    a distance between the fifth terminal and the magnetic sensor and a distance between the sixth terminal and the magnetic sensor are equal or substantially equal.

9. The motor of claim 1, further comprising:
    a rotor;
    a stator; and
    a magnetic sensor to detect a rotation angle of the rotor; wherein
    the windings of each phase are wound around the stator using a crossover wire, and the magnetic sensor and the crossover wire are disposed on the sides opposite to each other when viewed from the stator.

10. An electric power steering device comprising the motor of claim 1.